United States Patent Office 3,076,020
Patented Jan. 29, 1963

3,076,020
NEW DERIVATIVES OF 1,4-BIS-STYRYLBENZENE AND OPTICAL BRIGHTENING THEREWITH
Walter Stilz, Horst Pommer, Robert Gehm, Oswald Schmidt, Heinrich Merteus, Manfred Hehl, and Wolfgang Grunwald, all of Ludwigshafen (Rhine), Germany, assignors to Badische Anilin- & Soda-Fabrik Aktiengesellschaft, Ludwigshafen (Rhine), Germany
No Drawing. Filed May 12, 1960, Ser. No. 28,530
Claims priority, application Germany May 15, 1959
8 Claims. (Cl. 260—475)

This invention relates to new derivatives of 1,4-bis-styryl-benzene and to optical brightening with such compounds.

1,4-bis-styryl-benzene derivatives which contain on at least one styryl group a carboxylic acid amide group attached to the phenyl radical by way of a nitrogen atom, are already known as optical brightening agents. To achieve a satisfactory brightening effect with these known compounds, they must be used in relatively large amounts. The conversion products inactive as brighteners and formed under the influence of light then form on the originally optically brightened substrate not inconsiderable amounts or deposits which make the substrate especially unattractive.

It is an object of this invention to provide optical brighteners which yield unobjectionable brightening effects even when used in small amounts. Another object of the invention is to provide optical brighteners which are very stable to the decomposing influence of light. A further object of the invention is to provide optical brighteners which have a good affinity for substrates (i.e., the substances to be brightened optically), especially cellulose and cellulose derivatives.

These and other objects and advantages of this invention are achieved by derivatives of 1,4-bis-styryl-benzene which are substituted in the phenyl radicals of the styryl groups by carboxylic acid amide groups or by esterified carboxylic groups, the nitrogen atoms in the amide groups bearing alkyl groups, preferably hydroxyalkyl groups, and the alcohol radical in the esterified carboxylic groups preferably bearing a hydroxyl radical.

The said substituents of the phenyl radical are derivatives of carboxyl groups which contain the carbonyl oxygen and increase the affinity to the substrate of the 1,4-bis-styryl-benzenes used as optical brighteners. They cause or increase the water-solubility of the 1,4-bis-styryl-benzenes or render them hydrophilic. Such derivatives may be termed esters which contain at least one free hydroxyl group in the alcohol radical, and as correspondingly substituted acid amides. Alcohols which are especially suitable for the esterification are therefore glycols, such as ethylene glycol, propane-diol, butane-triol, sugar alcohols, such as sorbitol and mannitol, glycerin, pentaerythritol, glycol esters, obtained for example from ethylene oxide. The amide groups can be derived from cycloalkyl- or alkyl-hydroxyalkylamines, mono- or di-hydroxyalkylamines, such as ethanolamine, propanolamine-(1,3)- or -(1,2), di-isopropanolamine, cyclohexylethanolamine and preferably from diethanolamine.

The said derivatives of carboxyl groups which are situated on the phenyl radicals of the styryl groups and which may be identical or different may be represented in the simplest cases by the formulae: —CONH—alkylene—OH, —CONR—alkylene—OH —CON—(alkylene—OH)$_2$ —CONH—CHR—alkylene—OH and —COO—alkylene—OH (R standing for an alkyl group with 1 to 4 carbon atoms or a cycloalkyl group). As alkylene groups there are preferred those with 1 to 4, particularly 2 to 3, carbon atoms, i.e., radicals derived from methane, ethane, propane, isopropane butane and isobutane. The nitrogen substituents may not only be hydroxyalkyl groups, but also aminoalkyl groups having from 2 to 4 or more carbon atoms. The carbon chain of the hydroxyalkyl groups may be interrupted by one or more nitrogen and/or oxygen atoms as in polyglycol ethers, hydroxyalkyl alkylene diamine or hydroxyalkyl dialkylene triamine. The alkyl or alkylene groups may contain for example 2, 3, 4 or 5 carbon atoms. The chains may be straight or branched. The hydroxyalkyl ester groups may also have a chain interrupted by nitrogen or oxygen atoms. The above-exemplified carboxylic acid amide substituents of the phenyl radicals of the styryl moiety may be comprised by the term —CO-hydroxyalkylamino groups, which term is intended to include both N-mono- and N-dihydroxyalkyl amides. The above-exemplified acid ester substituents of the phenyl radicals of the styryl moiety may be comprised by the term —CO-hydroxyalkoxy groups.

A special embodiment of the invention comprises mixtures of 1,4-bis-styryl-benzenes in which the carboxylic acid amide or esterified carboxylic groups are attached in para,para'-position, in meta,meta'-position and in para,meta'-position to the phenyl radical in the styryl groups.

The central benzene nucleus of the 1,4-bis-styryl-benzenes may bear, in addition to the styryl radicals, substituents which impart to the optical brighteners no higher ultraviolet absorption maximum or maxima than about 380 millimicrons, measured as bands of maximum extinction in dioxane, and limit the main maximum or main maxima of the fluorescence spectrum to the range between about 390 millimicrons and 450 millimicrons, also measured in dioxane. Such substituents include one or two of the radicals halogen, aklyl or aralkyl situated in ortho or ortho' position to the styryl groups.

The 1,4-bis-styryl-benzenes may be prepared in an especially favorable way by reacting ortho-, meta- or para-halogenmethylbenzoic acid or their esters in a manner known per se with the aid of a triarylphosphine and a proton acceptor according to the principle of the ylide reaction with a terephthalaldehyde and possibly converting the carboxyl groups, previously or subsequently, into the desired ester or amide groups. The ylide reaction, of which the principle may be seen from copending application Serial No. 28,546, filed May 12, 1960, may be carried out with special advantage in dimethylformamide or dimethylsulfoxide as solvent. Alkali alcoholates, especially sodium alcoholates, are examples of suitable proton acceptors. If the 1,4-bis-styryl-benzene thus obtainable bear free carboxyl groups on the styryl groups, they are converted into amide or ester groups. Ester groups can be converted into amide groups.

The above-mentioned mixtures of 1,4-bis-styryl-benzenes are obtainable by various methods. They are obtained especially advantageously by reacting mixtures of meta- and para-halogenmethylbenzoic acids or their esters with terephthalaldehydes with the aid of a triaryl phosphine and a proton acceptor. Mixtures of 50 to 98% by weight of the meta-compound and 50 to 2% by weight of the para-compound may be used. It is preferable to use as initial materials mixtures which contain 80 to 97% by weight of the meta- and 3 to 20% by weight of the para-compounds. The mixtures may be obtained in the way described in the following Examples 9, 12 and 15. The free carboxylic groups on the phenyl radicals of the styryl groups are converted into ester or amide groups. The ester groups can be converted into amide groups.

The 1,4-bis-styryl-benzenes may be used for optical is chemically bleached in a closed apparatus suitable for temperatures above 100° C. with a bath which contains 2 ccs. per liter of hydrogen peroxide (35%), 1 gram per liter of sodium hydroxide, 4 ccs. per liter of waterglass 38° Baumé, 0.5 gram per liter of magnesium sulfate ($MgSO_4.7H_2O$) and 0.003 to 0.01 gram per liter of the compound I for an hour at 115° to 120° C. at a liquor ratio of 10:1 and thereby optically brightened. After rinsing and drying there results not only the chemical bleaching effect but also an intense optical white effect.

*Example 4*

0.1 to 0.5 gram of the compound I specified in Example 1 is added to 1 kilogram of an ordinary household detergent for white washing. After washing with a concentration of the detergent of 5 grams to 10 grams per liter, rinsing and drying, a pure white material is obtained which exhibits an excellent optical brightening effect.

*Example 5*

Previously cleansed polycaprolactam fabric is treated at a liquor ratio of 50:1 at 70° to 90° C. in a bath which contains 0.005 to 0.01 gram per liter of the compound I and 2% of formic acid (85%) with reference to the weight of the fabric. An excellent optical brightening effect is obtained.

*Example 6*

Yellowish white paper is treated with a solution which contains 0.01 to 0.06 gram per liter of compound I. After rinsing and drying, the paper exhibits a distinct brightening effect of good fastness to light. The same effect can also be achieved by adding 0.05 to 0.12 gram per liter of the same compound to the usual paper pulp.

*Example 7*

Uncolored soiled washing is washed with a conventional household detergent for white washing (without any optical brightener). The washed goods are then treated at a liquor ratio of 20:1 to 50:1 for 10 to 20 minutes at 20° to 40° C. with a bath which contains per liter about 0.003 to 0.01 gram of the compound I according to Example 1. A very well optically brightened washed material is obtained.

*Example 8*

Previously cleansed or previously bleached cotton fabric is treated for 20 minutes at 50° to 60° C. at the ratio 50:1 in a liquor which contains 0.003 to 0.01 gram per liter of 1,4-bis-(meta-carbdiethanolamido-styryl)-benzene (II) and 5 grams per liter of sodium sulfate ($Na_2SO_4.10H_2O$), rinsed and dried. A dazzling whiteness of good fastness to light and washing is produced.

The compound II can be prepared analogously to compound I; instead of para-chlormethylbenzoic acid ester, meta-chlormethylbenzoic acid ester is reacted. The following physical data are established for 1,4-bis-(meta-carbmethoxy-styryl)-benzene: melting point 206° to 207.5° C.; ultraviolet spectrum: $\lambda_{max}$ 358 millimicrons; fluoroescence spectrum: $\lambda_{max}$ 392, 412 millimicrons.

*Example 9*

Previously cleansed or previously bleached cotton fabric is treated for 20 minutes at 50° to 60° C. at the ratio 50:1 in a liquor which contains 0.01 to 0.03 gram per liter of a brightener solution prepared by the method described in the next paragraph or in Examples 12 and 15 and 5 grams per liter of crystallized sodium sulfate or another neutral salt. The fabric after the treatment has a dazzling neutral whiteness of good fastness to light and washing.

For the preparation of the optically brightening mixture of substances, 270 parts of terephthalaldehyde, 1028 parts of meta-carbmethoxy-benzyl-phosphonic acid diethyl ester and 182 parts of para-carbmethoxy-benzylphosphonic acid diethyl ester are dissolved in 900 parts by volume of dimethylformamide. To this solution there are added in the course of 4 hours at 30° to 40° C. while stirring, 920 parts by volume of a 30% solution of sodium methylate in methanol. The mixture is stirred for 3 hours at room temperature, 1500 parts by volume of water are added and neutralization effected by adding dilute sulfuric acid. The suspension obtained is heated to boiling for 30 minutes and the pale yellow precipitate is filtered off sharply. The precipitate is suspended in 1000 parts by volume of methanol, the mixture heated to boiling for 30 minutes, filtered by suction and the residue dried. There are thus obtained 624 parts of a mixture of 1,4-bis-(para-carbmethoxy-styryl)-benzene, 1,4-bis-meta-(carbmethoxy-styryl)-benzene and 1-(para-carbmethoxy-styryl)-4-meta'-carbmethoxy-styryl)-benzene as a fine pale yellow powder.

2090 parts of diethanolamine are added to 1100 parts of the said mixture and heated for 1 hour while leading nitrogen through at 200° to 210° C. The mixture is allowed to cool to 90° C. and made up with water to 5020 parts by volume. A pale brown solution is thus obtained which can be added to the substrates to be brightened.

The mixture of active substances may also be prepared as follows:

30.6 parts of meta-chlormethylbenzoic acid methyl ester and 5.4 parts of para-chlormethylbenzoic acid methyl ester are stirred with 60 parts of triphenylphosphine in 200 parts by volume of dimethylformamide or dimethylsulfoxide for 3 hours at about 80° C. 13 parts of terephthalaldehyde and, after about 5 minutes, 45 parts of a 30% solution of sodium methylate in methanol are added. The mixture is stirred for 3 hours at room temperature, 150 parts by volume of methanol added and neutralization effected by adding glacial acetic acid. The precipitate thus formed is filtered off by suction. The reaction product is suspended in 300 parts by volume of water, heated for 30 minutes to boiling, filtered by suction and the residue dried. There are thus obtained 28 parts of a mixture of 1,4-bis-(para-carbmethoxy-styryl)-benzene, 1,4-bis-(meta-carbmethoxy-styryl)-benzene and 1-para-carbmethoxy-styryl)-4-(meta'-carbmethoxy-styryl)-benzene as a fine pale yellow powder.

Reaction with diethanolamine is then carried out as described above.

*Example 10*

Previously cleansed or previously bleached cotton fabric is treated for an hour at 90° C. in a liquor (liquor ratio 50:1) which contains 0.01 to 0.03 gram per liter of the brightener solution obtained as described in Examples 9, 12 or 15 and 3 grams per liter of sodium dithionite and optionally 0.25 gram per liter of a fatty alcohol sulfonate or another detergent, rinsed and dried. An excellent white effect of good fastness to light and washing is produced.

*Example 11*

Previously cleansed cotton yarn in the form of cheeses is chemically bleached in a closed apparatus suitable for temperatures above 100° C. with a bath which contains 2 ccs. per liter of 35% hydrogen peroxide, 1 gram per liter of sodium hydroxide, 4 ccs. per liter of waterglass 38° Baumé, 0.5 gram per liter of crystallized magnesium sulfate and 0.01 to 0.03 gram per liter of a brightener solution obtained as described in Example 9, 12 or 15, for an hour at 115° to 120° C. at a liquor ratio of 10:1 and thereby optically brightened. After rinsing and drying there is obtained, over and above the chemical bleaching effect, an intense optical whitening effect.

*Example 12*

0.3 to 1.5 grams of a brightener solution obtained by the method of preparation described in Example 9 or 15 or in the next paragraph are added to 1 kilogram of an ordinary household detergent for white washing. After washing with a concentration of detergent of 5 to 10 grams per liter, rinsing and drying, pure white washing is obtained which has been excellently optically brightened without objectionable tinge of color.

The mixture of active substances is prepared as follows:

270 parts of terephthalaldehyde, 1065 parts of meta-carbmethoxy-benzyl-phosphonic acid diethyl ester and 145 parts of para-carbmethoxy-benzyl-phosphonic acid diethyl ester are dissolved in 1200 parts by volume of dimethylformamide and in the course of 4 hours at 30° to 40° C., 920 parts by volume of a 30% solution of sodium methylate in methanol are added. The mixture is stirred for another 3 hours at room temperature, 1500 parts by volume of water added and neutralization effected by adding dilute sulfuric acid. A suspension is obtained which is boiled for 30 minutes. The pale yellow precipitate formed is filtered off sharply by suction. 1000 parts of methanol are then added, the mixture boiled for 30 minutes, filtered by suction and the residue dried. There are thus obtained 618 parts of a mixture of 1,4-bis-(para-carbmethoxy-styryl)-benzene, 1,4-bis-(meta-carbmethoxy-styryl)-benzene and 1-(para-carbmethoxy-styryl)-4-(meta'-carbmethoxy-styryl)-benzene as a pale yellow fine powder.

Further working up is as described in Example 9.

Example 13

Previously cleansed polycaprolactam fabric is treated at a liquor ratio of 50:1 at 70° to 90° C. in a bath which contains 0.015 to 0.03 gram per liter of a brightener solution obtained as described in Example 9, 12 or 15 and 2% of formic acid (85%) with reference to the weight of fabric. An excellent optical brightening effect is obtained.

Example 14

Yellowish white paper is treated with a solution which contains 0.03 to 0.02 gram per liter of a brightener solution obtained as described in Example 9, 12 or 15. After rinsing and drying, the paper exhibits a distinct brightening effect of good fastness to light. The same effect can also be obtained by adding 0.15 to 0.4 gram per liter of the same mixture to the usual paper pulp.

Example 15

Uncolored soiled washing is washed with a customary household detergent for white washing (without an optical brightener). The washed goods are then treated at a liquor ratio of 20:1 to 50:1 for 10 to 20 minutes at 20° to 40° C. with a bath which contains per liter about 0.01 to 0.03 gram of a brightener solution as described in Example 9 or 12 or the next paragraph. Washed goods with a pure neutral white effect are obtained which have a very good optical brightening effect.

For the production of the optically brightening mixture of active substances 270 parts of terephthalaldehyde, 1089 parts of meta-carbmethoxy-benzyl-phosphonic acid diethyl ester and 121 parts of para-carbmethoxybenzyl-phosphonic acid diethyl ester are dissolved in 1200 parts by volume of dimethylformamide and in the course of 4 hours at 30° to 40° C., 920 parts by volume of a 30% solution of sodium methylate in methanol are added. The mixture is stirred for 3 hours at room temperature, 1500 parts by volume of water are added and neutralization effected by adding dilute sulfuric acid.

Further working up is carried out as described in Example 9.

Example 16

Previously cleansed or previously bleached cotton fabric is treated for 20 minutes at 50° to 60° C. at the ratio 50:1 in a liquor which contains 0.01 to 0.03 gram per liter of a brightener solution according to Example 9, 12 or 15 and 5 grams per liter of crystallized sodium sulfate, rinsed and dried. There is produced a dazzling white effect of good fastness to light and washing.

Example 17

Previously cleansed or previously bleached cotton fabric is treated at 50° to 60° C. in a liquor containing 0.003 to 0.01 gram per liter of 1,4-bis-(meta-carbdiisopropanolamido-styryl)-benzene (compound III) and 5 grams per liter of sodium sulfate ($Na_2SO_4.10H_2O$) at a liquor ratio of 50:1, rinsed and dried. The goods obtained exhibit a very good optical brightening effect and good fastness to light and to washing.

The compound III can be prepared in an analogous manner to compound II. 1,4-bis-(meta-carbmethoxy-styryl)-benzene is reacted at 190° to 220° C. with an excess of diisopropanolamine to form compound III, which may be used without further working up.

Example 18

Previously cleansed or previously bleached cotton fabric is treated at 50° to 60° C. in a liquor containing 0.003 to 0.01 gram per liter of 1,4-bis-(meta-carb-(hydroxyethylamino)-ethylamido-styryl)-benzene (compound IV) and 5 grams per liter of sodium sulfate ($Na_2SO_4.10H_2O$). The goods obtained exhibit a very good optical brightening effect and good fastness to light and to washing.

The compound IV can be prepared in an analogous manner to compound II. 1,4-bis-(meta-carbmethoxy-styryl)-benzene is reacted at 190° to 220° C. with an excess of aminoethylethanolamine to form compound IV, which may be used without further working up.

Example 19

0.10 to 0.5 gram of 1,4-bis-(meta-N-cyclohexylisopropanolamidostyryl-styryl)-benzene (compound V) is added to 1 kilogram of a customary household detergent for white washing. After washing at a concentration of 5 to 10 grams of detergent per liter, rinsing and drying, the goods are white and exhibit a very good optical brightening effect.

The compound V is obtained in an analogous manner to compound II. 1,4-bis-(meta-carbmethoxy-styryl)-benzene is reacted at 190° to 220° C. with an excess of N-cyclohexyl-isopropanolamine. The reaction product is used without further working up.

Example 20

Previously cleansed or previously bleached cotton fabric is treated for 20 minutes at 50° to 60° C. in a liquor containing 0.003 to 0.1 gram per liter of an optical brightening composition (liquor ratio 50:1) prepared as described in the following paragraph and 5 grams per liter of crystallized sodium sulfate or another neutral salt. After the treatment the goods exhibit a dazzling neutral whiteness of good fastness to light and washing.

For the preparation of the optically brightened composition, 270 parts of terephthalaldehyde, 1089 parts of meta-carbmethoxy-benzyl phosphonic acid diethyl ester and 121 parts of para-carbmethoxy-benzyl-phosphonic acid diethyl ester are dissolved in 1200 parts by volume of dimethylformamide and to this solution there are added during 4 hours at 30° to 40° C. 920 parts by volume of a methanolic sodium methylate solution 30%. The mixture is stirred for 3 hours at room temperature. 1500 parts by volume of water are added and neutralization effected by adding dilute sulfuric acid. The suspension obtained is heated for 30 minutes at the boil and the pale yellow precipitate filtered off sharply by suction. The precipitate is suspended in 1000 parts by volume of methanol, the mixture heated at the boil for 30 minutes, filtered by suction and the residue dried. There are thus obtained 621 parts of a mixture of 1,4-bis-(para-carbmethoxy-styryl)-benzene, 1,4-bis-(meta-carbmethoxy-styryl)-benzene and 1-para-carbmethoxy-styryl-4-meta-carbmethoxy-styryl benzene as a fine pale yellow powder.

40 parts of the said mixture are heated for 2 hours at 200° to 210° C. together with 567 parts of diisopropanolamine while leading nitrogen through. A pale brown solution is thus obtained which can be added to the substrates to be brightened.

The results obtainable in the above examples are also obtained in a similar way by the use of 1,4-bis-styryl-benzenes of the general formula:

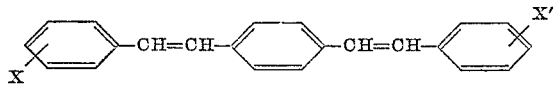

in which X and X′ stand for identical or different groups of the following formulae:

```
CONH—C₂H₄OH,  CONH—C₃H₆OH,  CON—(C₃H₆OH)₂
CONH—C₄H₈OH,  CON—(C₄H₈OH)₂,  CO—N—C₂H₄OH
                                      |
                                      cyclohexyl CO—N—C₃H₆OH,  CONH—C₂H₄—NH—C₂H₄—OH
   |
   cyclohexyl
```

The radicals $C_3H_6$ and $C_4H_8$ may be branched or linear. For technical reasons, the para- and meta-positions are preferred for X and/or X′. 1,4-bis-styryl-benzenes with hydroxyalkylamide groups are above all suited for the optical brightening of cellulose fibers or films. The term cellulose is intended to include natural cellulose, such as cotton, linen and paper, regenerated cellulose and cellulose esters. The 1,4-bis-styryl-benzenes with hydroxyalkylamide groups also give very good optical brightening on polyamides, by which we means synthetic high molecular weight polyamides having a plurality of carboxylic acid amide groups in the molecule, obtainable for example from lactams, from carboxylic acid amides or from dicarboxylic acids and diamines. The 1,4-bis-styryl-benzenes with hydroxyalkylamide groups are very hydrophilic, go on to the said substrates very well, adhere very firmly thereto and give very stable brightening effects. The said 1,4-bis-styryl-benzenes are therefore a valuable contribution to the art not only in their industrial application but also in the use of the optically brightened materials. These valuable features could not have been foreseen.

When X and X′ in the above general formula stand for COO—$C_2H_4$OH, COO—$C_3H_6$OH or COO—$C_4H_8$OH, Furthermore, the hydrogen atoms of the hydroxyl groups in both the amides and the esters may be substituted by the glycol ether groups —(OC₂H₄)ₙ—OH or —(OC₃H₆)ₙ—OH in which $n$ represents an integer of from 1 to 20 or more such as 30 or 40. These derivatives may be obtained by the reaction of the above-described amides or esters containing hydroxy groups with ethylene oxide or propylene oxide.

We claim:

1. The 1,4-bis-styryl-benzene of the formula

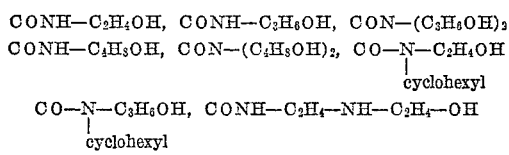

wherein: A and A′ each represent a member selected from the group consisting of

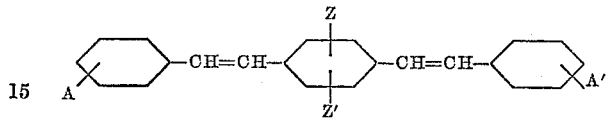

and

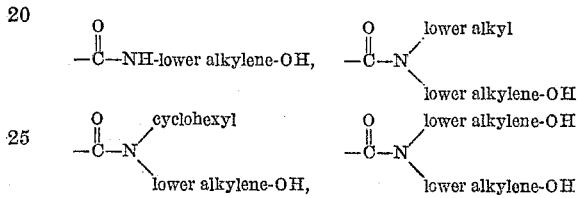

and Z and Z′ each represent a substituent selected from the group consisting of hydrogen, alkyl and halogen, said Z and Z′ being limited to substituents which impart a maximum ultraviolet absorption value of not higher than 380 millimicrons and a fluorescence spectrum value between about 390 and 450 millimicrons, said values being measured as bands of maximum extinction in dioxane.

2. The 1,4-bis-styryl-benzene of the formula

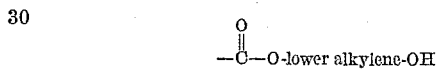

the para- and meta-positions being again preferred for X and X′ and the radicals $C_3H_6$ and $C_4H_8$ being linear or 3. The 1,4-bis-styryl-benzene of the formula

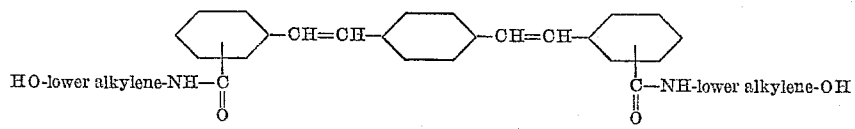

4. The 1,4-bis-styryl-benzene of the formula

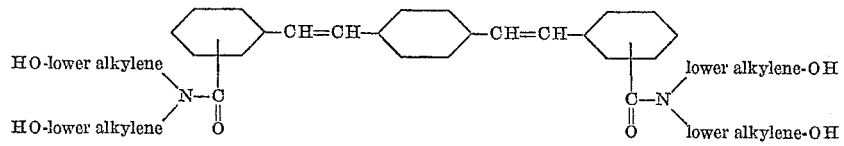

branched, similar but not quite so good effects are obtained as with the hydroxyalkylamides.

5. The 1,4-bis-styryl-benzene of the formula

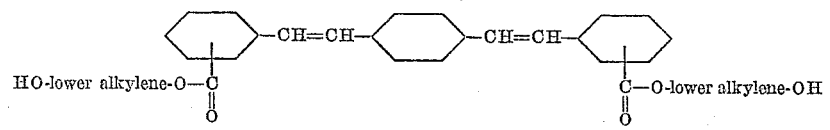

6. The 1,4-bis-styryl-benzene of the formula

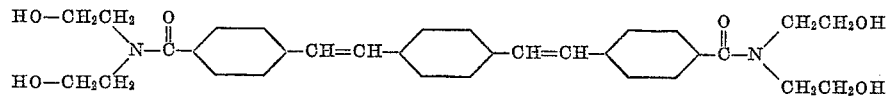

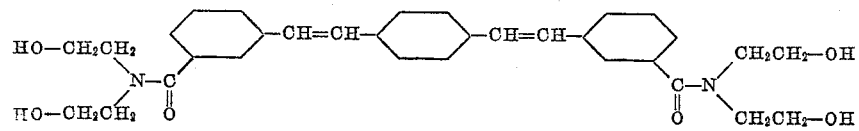

7. The 1,4-bis-styryl-benzene of the formula
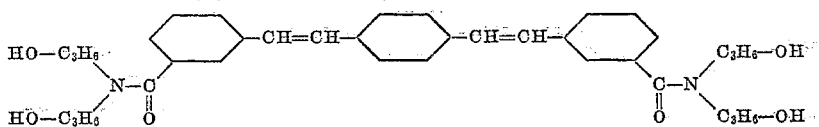
8. The 1,4-bis-styryl-benzene of the formula
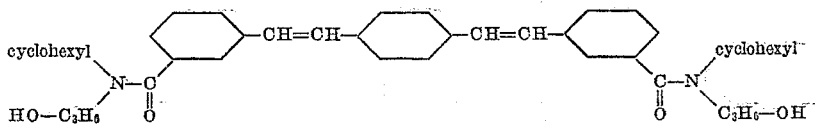
References Cited in the file of this patent
UNITED STATES PATENTS
| | | |
|---|---|---|
| 2,527,427 | Keller et al. | Oct. 24, 1950 |
| 2,547,910 | Hausermann et al. | Apr. 3, 1951 |
| 2,610,191 | Toland | Sept. 9, 1952 |
| 2,723,288 | Roberts | Nov. 8, 1955 |
| 2,806,054 | Eder | Sept. 10, 1957 |
| 2,997,391 | Murray et al. | Aug. 22, 1961 |
OTHER REFERENCES
Schmitt et al.: Comptes Rendus, vol. 242, pp. 649 to 651 (1956).

UNITED STATES PATENT OFFICE
CERTIFICATE OF CORRECTION

Patent No. 3,076,020　　　　　　　　　　　January 29, 1963

Walter Stilz et al.

It is hereby certified that error appears in the above numbered patent requiring correction and that the said Letters Patent should read as corrected below.

Column 1, line 56, for "esters" read -- ethers --; column 2, line 4, before "butane" insert a comma; columns 3 and 4, lines 48 to 64, for that portion of the formula reading "$CH_3COC-$" read -- $CH_3OOC-$ --.

Signed and sealed this 10th day of December 1963.

SEAL)
Attest:

NEST W. SWIDER　　　　　　　　　　　EDWIN L. REYNOLDS

Attesting Officer　　　　　　　　　　　Acting Commissioner of Patents